United States Patent [19]

Ito et al.

[11] 4,049,518

[45] Sept. 20, 1977

[54] MULTI-STEP RADIATION PROCESS OF PRODUCING POLYOXYMETHYLENES

[75] Inventors: Akihiko Ito, Takasaki; Akira Shimizu, Tokyo; Koichiro Hayashi, Neyagawa, all of Japan

[73] Assignee: Japan Atomic Energy Research Institute, Tokyo, Japan

[21] Appl. No.: 497,647

[22] Filed: Aug. 15, 1974

Related U.S. Application Data

[63] Continuation-in-part of Ser. No. 381,445, July 23, 1973, abandoned, which is a continuation of Ser. No. 144,308, May 17, 1971, abandoned, which is a continuation of Ser. No. 788,637, Jan. 2, 1969, abandoned.

[30] Foreign Application Priority Data

Feb. 8, 1968    Japan .................................. 43-7457

[51] Int. Cl.$^2$ ............................................... C08G 2/02
[52] U.S. Cl. ......................... 204/159.21; 260/67 FP
[58] Field of Search ............... 204/159.21; 260/67 FP

[56] References Cited

U.S. PATENT DOCUMENTS

| | | | |
|---|---|---|---|
| 3,242,063 | 3/1966 | Okamura et al. | 204/159.21 |
| 3,305,464 | 2/1967 | Marans | 204/159.21 |
| 3,346,663 | 10/1967 | Kern et al. | 260/823 |
| 3,438,883 | 4/1969 | Marans et al. | 204/159.21 |
| 3,684,767 | 8/1972 | Ito et al. | 260/67 FP |
| 3,830,715 | 8/1974 | Ito et al. | 204/159.21 |

*Primary Examiner*—Richard B. Turer
*Attorney, Agent, or Firm*—Toren, McGeady and Stanger

[57] ABSTRACT

A multi-step process of producing polyoxymethylenes by solid state polymerization of trioxane is disclosed.

Trioxane is irradiated with ionizing radiation within a temperature range in which no polymerization of trioxane takes place. The irradiated trioxane is then polymerized by raising the temperature to a value at which polymerization of trioxane takes place, said temperature value being at least 15° C above the first mentioned temperature. The polymerization is effected in the presence of an amount of alkyl acetal. The polymerized product thus obtained is then again irradiated, whereupon further polymerization of the irradiated product takes place.

The resulting polyoxymethylenes are snow white and exhibit excellent thermal stability. They also have high molecular weights.

11 Claims, No Drawings

MULTI-STEP RADIATION PROCESS OF PRODUCING POLYOXYMETHYLENES

CROSS-REFERENCE TO PRIOR APPLICATIONS

This is a continuation-in-part of application Ser. No. 381,445 filed July 23, 1973, now abandoned, which in turn was a continuation of Ser. No. 144,308 filed May 17, 1971 and now abandoned, which in turn, was a continuation of Ser. No. 788,637, filed Jan. 2, 1969, now abandoned.

FIELD OF INVENTION

The invention is directed to the production of polyoxymethylenes by solid state polymerization of trioxane.

BACKGROUND INFORMATION AND PRIOR ART

It is well known in the art that polyoxymethylenes can be prepared by solution-polymerizing or bulk-polymerizing trioxane at relatively high temperatures and in the presence of an ionic polymerization catalyst. It is also known that polyoxymethylenes can be prepared by irradiating trioxane in solid state with ionizing radiation. (See U.S. Pat. Nos. 3,242,063 and 3,305,464.) However, it is a fact that polyoxymethylene produced by the known prior art methods exhibit poor thermal stability and have to be subjected to esterification or etherification at their terminal groups for purposes of stabilization since otherwise the polyoxymethylenes produced would not be useful for commercial purposes, to wit, for use as plastic materials. Several methods for such stabilization of the terminal group have been proposed. Thus, for example, according to one procedure, the polyoxymethylene is reacted with 2 to 20 parts by weight, per part of polyoxymethylene, of an anhydride of a saturated, monobasic, carboxylic acid. The reaction is carried out at about 50° C or above or cause esterification of the terminal groups (see U.S. Pat. No. 2,964,500). It is also known to effect such stabilization by reacting the polyoxymethylene with an alkyl acetal or the like to etherify the terminal groups of the polyoxymethylene. (See British Pat. No. 868,365.)

There has also been proposed a method for preventing coloration of the polyoxymethylene according to which the esterification procedure is carried out in the presence of a urea derivative (see French Pat. No. 1,364,410). Further, it has been suggested to prevent a significant lowering of the molecular weight of the polyoxymethylene in the course of the esterification by adding carbodiimide to the reaction system (see British Pat. No. 864,403).

It is an accepted view in this art that esterification is deemed to be preferably to esterification for stabilization purposes. As a matter of fact, the etherified polymer exhibits superior alkali-resistance as compared to the esterified polymer. Moreover, even in the case when the etherified polymer decomposes, no acids are produced which would tend to accelerate further decomposition. However, as is known, an acidic catalyst is customarily employed for the etherification purposes. It is generally recognized that the use of such acid or acidic catalyst is undesirable becaue it has a tendency to cause decomposition of the polymer in the course of the etherification (see M. Sittig, "Hydrocarbon Processing" Vol. 41, No. 11, p. 151).

Still another procedure for the production of polyoxymethylene containing at least partially stable terminal groups, resides in the polymerization of trioxane in the liquid phase in the presence of ionic catalysts and in the presence of chain transfer agents, such as noncyclic acetals. (See U.S. Pat. No. 3,346,663.)

However, no data as to the molecular weight of the resulting polymers are disclosed or available. From an article by Werner Kern, a co-invertor of this procedure, published in Makromol. Chem., 83, 63 (1965), it can be reasonably concluded that this last mentioned prior art procedure is incapable of producing polyoxymethylenes of sufficiently high molecular weights so as to make them industrially interesting. The article in question, and particularly pages 63 through 65 thereof, contains graphs which indicate the relationship between the degree of polymerization and the ratio of [dimethylformal]/ [trioxane] of polymers obtained by the solution polymerization of trioxane in a nitrobenzene solution. When 1 mole % of diemthy formal (formaldehyde dimethyl acetal) is added to trioxane, the resulting degree of polymerization will be 50, or 5,000 in terms of molecular weight, which is too low for commercial purposes. According to this article, the molecular weight of the polymer is low due to the water content. (See p. 64.) Yet, the molecular weight of the polymer in the presence of water and in the absence of dimethyl formal is 50,000. (See p. 64.) This means that the molecular weight is lowered to one-tenth by the addition of 0.76 wt. % of dimethyl formal only.

It has also been proposed to prepare polyoxymethylene exhibiting improved thermal stability by copolymerizing trioxane with olefin oxides (see U.S. Pat. No. 3,027,352). It has, however, been established, that the copolymers thus obtained are inferior in respect of their mechanical strength, as compared to homopolymers of trioxane.

SUMMARY OF THE INVENTION

It is a primary object of the present invention to provide an improved procedure for producing polyoxymethylenes which overcomes the disadvantages and drawbacks of the prior art procedures and which results in polymethylenes of superior characterisitics and commerical utility.

It is another object of this invention to provide a procedure for producing polyoxymethylenes which have etherified end groups.

Still another object of the invention is to provide a procedure for polymerizing trioxane with the use of radiation, whereby polyoxymethylenes having a very high molecular weight, as compared to the molecular weight of the prior art products, are obtained (see U.S. Pat. No. 3,346,663, and Makromol. Chem., Vol. 83, 63, 1965).

It is also an object of the prent invention to provide a procedure of the indicated kind wherein the etherification of the polyoxymethylenes takes place simultaneously with the polymerization.

Another object of the invention is to provide a process of the indicated kind wherein the ether-terminated polyoxymethylenes are obtained with the acid of alkyl acetal as the chain transfer agent.

Yet another object of the invention is to provide a process of the indicated kind wherein ether-terminated polyoxymethylenes are readily produced with the aid of alkyl acetal and in the absence of catalysts.

It is also an object of the invention to provide a procedure for producing snow-white polyoxymethylenes exhibiting superior thermal stability.

Generally, it is an object of the invention to improve on the art of producing polyoxymethylenes by solid state polymerization of trioxane.

Briefly, and in accordance with the invention, polyoxymethylenes are produced by solid state polymerization of trioxane in a multi-step procedure as follows:

Step (a)

Trioxane is first irradiated with ionizing radiation at a first temperature which is within a first temperature range in which no polymerization of trioxane takes place.

Step (b)

The irradiated trioxane is then caused to polymerize by raising the first temperature to a second temperature which is at least 15° C above the first temperature and is within a second temperature range within which polymerization of trioxane takes place. The polymerization of Step (b) is effected in the presence of an amount of alkyl acetal.

Step (c)

The thus polymerized product is thereafter again irradiated and

Step (d)

further polymerization of the irradiated product is then effected.

The first temperature range of Step (a) has advantageously a lower temperature value of about −78° C while the second temperature range of Step (b) has advantageously an upper temperature value at +64° C. The irradiation of Step (c) is then carried out at a temperature of below +64° C.

In one embodiment of the invention the alkyl acetal is at least partially present during the irradiation of Step (a). In another embodiment, at least a portion of the alkyl acetal is added to the trioxane during Step (b).

The aklyl acetal should have the formula

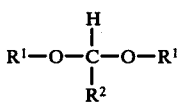

wherein $R^1$ is alkyl having 1–6 carbon atoms and $R^2$ is selected from the group consisting of hydrogen and alkyl having 1–5 carbon atoms.

The amount of alkyl acetal in the system should preferably be between about 0.1 to about 5% by weight.

The upper temperature limit of the first temperature range referred to and the lower temperature limit of the second temperature range referred to is preferably about room temperature.

The irradiation of Step (a) is carried out at a dose of $5 \times 10^4$ to $2 \times 10^6$ R.

According to a preferred embodiment, Step (a) is carried out within a first temperature range of about −78° C at room temperature, while Step (b) is carried out within a second temperature range of about between +45° C to +58° C.

Excellent results are obtained if the irradiation of Step (c) is carried out with a dose of $5 \times 10^4$ to $10^6$ R.

Experiments have indicated that satisfactory results are obtained if the irradiation of Step (c) is effected above room temperature, whereby the further polymerization of Step (d) takes place simultaneously with Step (c). It has also been established that commerically suitable products are obtained if the irradiation of Step (c) is effected at a temperature within said first temperature range, whereafter the temperature is raised to a valve within said second temperature range to cause the further polymerization of Step (d).

Pursuant to a preferred embodiment of the invention, according to which polyoxymethylenes are produced by polymerizating trioxane at temperatures between room temperature and 64° C in the presence of alkyl acetal, the following parameters apply:

a. The trioxane is polymerized in solid state;
b. The alkyl acetal has the above indicated formula;
c. The amount of alkyl acetal is about 0.1 to about 5% by weight; and
d. The method is effected in stages by
  i. first irradiating a mixture of trioxane and alkyl acetal with ionizing radiation at a first temperature value of between −78° C and room temperature;
  ii. then raising the temperature to a second temperature value of between room temperature and +64° C, to effect polymerization, said second temperature value being at least 15° C higher than said first temperature value;
  iii. thereafter again irradiating the polymerized product with ionizing radiation at a temperature below +64° C, to effect further polymerization.

Although applicants do not wish to be restricted to any theory advanced by them, it is believed that the high molecular weight polyoxymethylenes are formed due to a mechanism according to which the acetal molecules enter the lattice defects which are caused primarily by irradiating trioxane crystals. The acetal molecules then react with the active sites of the polymer mainly in the defective areas of the lattice. It appears thus that the random chain transfer reaction which occurs typically during the polymerization in the liquid phase, does not occur in the case of radiation-induced polymerization of trioxane in the solid state, but occurs instead mainly at the limited positions in the crystal referred to.

According to the prior art, the presence of a chain transfer agent, such as a non-cyclic acetal, during the polymerization of trioxane, has resulted in the production of polyoxymethylenes of very low molecular weights, even if the acetal was present in small amounts. Accordingly, it can be reasonably stated that, if the chain transfer agent is used in an amount such that the thermal stability of the resulting polyoxymethylenes is significantly improved, the polyoxymethylenes will, however, have a molecular weight which is too low to make the polymers useful for commercial or industrial purposes. By contrast, the radiation-induced polymerization of crystalline trioxane according to the present invention results, even in the presence of alkyl acetal, in polyoxymethylenes which have not only significantly improved thermal stability but which also have industrially satisfactory molecular weights. Moreover, it has been established that the polyoxymethylenes produced according to the invention are not colored and do not become discolored by irradiation but preserve their snow-white color indefinitely.

The advantages of the invention are thus that a snow-white product is obtained which has sufficiently high molecular weight so as to be useful as a plastic material while at the same time exhibiting superior thermal stability.

The process of the present invention can be carried out with any trioxane. However, from a practical point of view, it is preferred that a trioxane is employed which has a melting point of at least 59° C and which is as pure as possible. The moisture content of the trioxane should preferably be 1.000 ppm or below.

As previously stated, the alkyl acetals which are added to the trioxane according to the process of this invention have the general formula

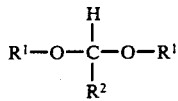

wherein $R^1$ is an alkyl radical having 1-6 carbon atoms and $R^2$ is hydrogen or an alkyl radical having 1-5 carbon atoms. Examples of such alkyl acetals include formaldehyde dimethyl acetal, formaldehyde diethyl acetal, acetaldehyde dimethyl acetal, acetaldehyde diethyl acetal, propionaldehyde dimethyl acetal, and propionaldehyde diethyl acetal. The most effective is the formaldehyde dimethyl acetal (boiling point, 43° C) which is in the gaseous state at a temperature in the range of 45°-58° C.

Again, without wanting to be limited to any theories advanced by applicants, it is believed that in the solid-state polymerization of trioxane the propagation reaction is controlled by the crystal lattice of the trioxane, since the polymerization proceeds primarily along the axis of the trioxane crystals. Accordingly, when the crystal structure is destroyed by addition of liquid material, the polymerization reaction is suppressed. However, vapor does not destroy the crystal lattice. For this reason and as stated, the formaldehyde dimethyl acetal is in the gaseous state at a temperature in which the solid-state polymerization reaction is preferably carried out, the indicated acetal is particularly suitable.

The amount of alkyl acetal to be added should be within the range of 0.01 to 10%, preferably 0.1 to 5% by weight of trioxane. Although the alkyl acetal may be added to the trioxane in liquid form, it is preferred that it be introduced in the form of a spray in order to be uniformly distributed throughout the system. As stated above, if formaldehyde dimethyl acetal is used as the alkyl acetal, the compound is most effective when added in the form of a gas or vapor. Excellent results are obtained if the system is evacuated at the time the alkyl acetal is added since in this manner the stability of the resulting polyoxymethylenes is considerably enhanced.

The alkyl acetal to be used in the inventive procedure should be free from excessive amounts of impurities, such as, for example, alcohols.

As ionizing radiation operable in the process of this invention, gamma-rays, X-rays and electron beam are especially preferred. High speed beams of neutrons, deutrons, alpha particles or nuclear fission fragments, and beta-rays can also be employed.

Generally, the addition of alkyl acetals to the system of radiation-induced polymerization of trioxane is operative to produce polyoxymethylenes having high molecular weights and improved thermal stability, as compared to those obtained by a conventional liquid phase polymerization of trioxane in the presence of an alkyl acetal. However, as is known, the presence of alkyl acetals in the radiation-induced polymerization system works adversely in respect to polymer yields.

The present procedure overcomes this inherent drawback of the presence of alkyl acetal by proceeding in the multi-step manner and within the temperature ranges as indicated above. In this manner, polyoxymethylenes which are significantly improved in respect of thermal stability and high molecular weight suitable for practical uses are obtained in high yields.

As stated above, the trioxane is first irradiated with ionizing radiation at a temperature range at which no polymerization of trioxane takes place. This irradiation may be effected in the presence or absence of the alkyl acetal. Generally, temperatures below room temperature are suitable for this irradiation step. The temperature may be as low as practically feasible for this purpose but from an operational point of view temperatures down to $-78°$ C are the most recommended. This first irradiation is preferably carried out with a dose of $5 \times 10^4$ to $2 \times 10^6$, preferably $10^5$ to $1.3 \times 10^6$R. The alkyl acetal, as stated, may be excluded from the reaction mixture at this stage.

The temperature is then raised to a temperature suitable for effecting after-irradiation polymerization, or "after-effect polymerization", as it is called hereinafter, such temperatures being preferably in the range of from room temperature up to 64° C (the melting point of trioxane), preferably 45° to 58° C, as in the case of the well-known radiation-induced polymerization.

This polymerization step, which previously has been referred to as Step (b), is carried out at a temperature which is at least 15° C above the temperature at which the previously mentioned radiation has been carried out. The alkyl acetal, if it has been added to the system during the irradiation of Step (a), will, of course, be present throughout the polymerization procedure of Step (b). If the alkyl acetal has not been added during Step (a) or has been added partially only, the alkyl acetal or the remainder thereof should be added during the polymerization of Step (b). In this context it is of no great consequence if the alkyl acetal or the remainder thereof is added at the beginning or during the polymerization of Step (b). As a matter of fact, the alkyl acetal can be added at any time but it is preferred if it be added prior to the start of the polymerization of Step (b).

According to Step (c) as referred to above, the polymerized product obtained in Step (b) is again subjected to irradiation. This second irradiation is preferably effected at a temperature below 64° C (the melting point of trioxane). The dose should be in the range of $5 \times 10^4$ to $10^6$R, preferably $10^5$ to $5 \times 10^5$R.

If the temperature at which the second irradiation is conducted is above room temperature, further polymerization will simultaneously take place. By contrast, if the second irradiation of Step (c) is effected below room temperature, no simultaneous further polymerization will take place, but after-effect polymerization will be subsequently effected (Step (d)). This means that the further polymerization is carried out either simultaneously with the additional irradiation or in the form of after-effect polymerization. In any event, this further polymerization takes place within a temperature range at which polymerization is feasible, to wit, usually from about room temperature up to about 64° C, preferably in a range of from $+45°$ to 58° C.

It should be appreciated that the multi-step polymerization procedure of the present invention has many advantages. Much higher polymer yields can be attained using the present procedure as compared to those obtained by the after-effect polymerization only in the presence of alkyl acetals. Moreover, unexpectedly improved thermal stability of the polymer is achieved by Steps (c) and (d) as shown in the Examples. As to the molecular weight of the polymer produced according to the present procedure, if irradiation and polymerization are carried out together (Steps (a) and (b)), it is difficult to obtain high molecular weight polyoxymethylene as compared with the post-effect polymerization as proposed in this invention. If irradiation and polymerization (Steps (a) and (b)) are conducted simultaneously, relatively low molecular weight polyoxymethylenes are formed and, in some instances, the molecular weight may be further lowered in the second stage radiation. In addition, acetals have a tendency to lower the moleculr weight of the polymer.

The polymerization reactions according to the present invention may be carried out in air atmosphere, in an ambient nitrogen atmosphere, under pressure or under vacuum conditions (reduced pressure). Experience has demonstrated that a slight increase in the polymerization yields takes place if the reactions are carried out in an air atmosphere.

Upon completion of the polymerization, the reaction mixture is washed with a solvent or heated under reduced pressure, to remove unreacted trioxane and alkyl acetal.

The invention will now be described by several Examples, it being understood, however, that these Examples are given by way of illustration and not by way of limitation and that many changes may be effected without affecting in any way the scope and spirit of the invention as recited in the appended claims.

The term "average thermal degradation rate $K_{222}$" used hereinafter means the average weight loss in %/minute of the product polymer in a nitrogen stream at 222° C, said weight loss being the difference between the weight at 10 minutes and the weight at 60 minutes after exposure of the polymer to said temperature in the nitrogen stream.

The intrinsic viscosity number of the product polymer in the following Examples was measured at 60° C as a solution in p-chlorophenol containing 2% of alpha-pinene.

EXAMPLE 1

To 1.5 g. of trioxane was added 0.03 g of formaldehyde dimethyl acetal in a 6 cc glass ampoule by means of a syringe. The ampoule was then sealed off in air and the content was allowed to stand at room temperature for 7 days to mix. The mixture was treated with gamma-ray irradiation of $1 \times 10^6$ R from a cobalt 60 source of 100 kilocuries at the rate of $5 \times 10^5$ R/hr. at −78° C. Immediately thereafter, the mixture was heated to 55° C to be allowed to polymerize for 4 hours. Thereafter, the mixture was cooled down to −78° C again and subjected to a secondary irradiation by the same gamma-rays for 1 hour at the dose rate of $2 \times 10^5$ R/hr, and then the temperature of the system was raised to 45° C to allow the mixture to polymerize for 24 hours. After the polymerization was over, the reaction mixture was taken out from the ampoule and thrown into methanol to be throughly rinsed and filtered. The resulting product was dried overnight at room temperature under reduced pressure, to yield 1.2 g of a white polymer, the yield being 80%. The intrinsic viscosity number and average thermal degradation rate $K_{222}$ of the polymer were 0.90 and 0.16, respectively. In the product polymer, the content of methoxy radicals was found to be 0.22% by weight, according to the measurement by Zetsel's method (see T. A. Koch and P. E. Lindvig, J. Appl. Polymer Sci., 1, 166). The test is referred to as Test 1.

The polymer produced from the above-described irradiation-polymerization process, prior to the secondary irradiation, was obtained in an amount of 0.42 g, the yield being 28%, and measured to have an intrinsic viscosity number of 0.85 and an average thermal degradation rate of 0.22.

For comparative purposes, the whole operation of Test 1 above was carried out with respect to trioxane only (that is, without the formaldehyde dimethyl acetal added), in a similar glass ampoule. The polymer product obtained was yellowish, and the yield was 75% in an amount of 1.13 g. Its intrinsic viscosity number and average thermal degradation rate were 1.3 and 0.6, respectively. This comparative test is referred to as Test 2.

For further comparative purposes, a mixture of trioxane and formaldehyde dimethyl acetal similar to that of Test 1 above was treated with gamma-ray irradiation of $1 \times 10^6$ R from cobalt 60 of 100 kilocuries at the rate of $5 \times 10^6$ R/hr. at −78° C. Immediately thereafter, the mixture was heated to 55° C to be allowed to polymerize for 28 hours. As a result, 0.42 g of a polymer product was obtained, the yield being 32%. Its intrinsic viscosity number and average thermal degradation rate were 0.9 and 0.21, respectively. This comparative test is referred to as Test 3.

For still further comparative purposes, the operation of Test 3 above was carried out with respect to trioxane only (that is, without the formaldehyde dimethyl acetal added). As a result, 1.05 g of a polymer product was obtained, the yield being 70%, with its intrinsic viscosity number and average thermal degradation rate being 2.5 and 1.0, respectively. This test is referred to as Test 4.

For purposes of ready reference, the above-mentioned irradiation and polymerization condition as well as the results thereof are tabulated in the following Table.

Table

| Test No. | Presence of acetal | | Irradiation | | | Polymerization | | | Polymer | | |
|---|---|---|---|---|---|---|---|---|---|---|---|
| | | | Dosage | Dose rate | ° C | Hrs. | ° C | Hrs. | Yield (%) | Viscosity (number) | $K_{222}$ |
| 1 | Yes | I* | $1 \times 10^6$R | $5 \times 10^5$R/hr | −78 | 2 | 55 | 4 | 28 | 0.85 | 0.22 |
| | | II* | $2 \times 10^5$R | $2 \times 10^5$R/hr | −78 | 1 | 45 | 24 | 80 | 0.90 | 0.16 |
| 2 | No | I* | $1 \times 10^6$R | $5 \times 10^5$R/hr | −78 | 2 | 55 | 4 | — | — | — |
| | | II* | $2 \times 10^5$R | $2 \times 10^5$R/hr | −78 | 1 | 45 | 24 | 75 | 1.3 | 0.6 |
| 3 | Yes | I** | $1 \times 10^6$R | $5 \times 10^5$R/hr | −78 | 2 | 55 | 28 | 32 | 0.9 | 0.21 |

Table-continued

| | | Irradiation | | | Polymerization | | | Polymer | | |
|---|---|---|---|---|---|---|---|---|---|---|
| Test No. | Presence of acetal | Dosage | Dose rate | °C | Hrs. | °C | Hrs. | Yield (%) | Viscosity (number) | $K_{222}$ |
| 4 | No I** | $1 \times 10^6$ R | $5 \times 10^5$ R/hr | −78 | 2 | 55 | 28 | 70 | 2.5 | 1.0 |

Note:
I*indicates the first irradiation-polymerization process.
II*indicates the secondary or repeated irradiation-polymerization process.
I**indicates a single irradiation-polymerization process.

EXAMPLE 2

2 g of trioxane was irradiated with 2-MeV electron beam from an electron accelerator at the dose of $10^5$ R in air at 20° C. The resulting product was put into a 10-cc glass ampoule, added and mixed with 0.02 g of formaldehyde dimethyl acetal, and then sealed off. The mixture was subjected to after-effect polymerization at 55° C for 3 hours. Thereupon, it was irradiated for the second time with gamma-rays from a cobalt 60 source at the dose rate of $5 \times 10^4$ R/hr. at 58° C for 6 hours, to effect simultaneous polymerization. The reacted mixture was taken out of the ampoule and washed, filtered and dried as in Example 1, to obtain 1.3 g of a white polymer at the yield of 65%. Average thermal degradation rate $K_{222}$:0.24; intrinsic vicosity number: 1.1.

Incidentally, the yield of the first after-effect polymerization prior to the second irradiation in the above test was 24%, the polymer produced being 0.48 g. Average thermal degradation rate $K_{222}$:0.48; intrinsic viscosity number: 1.1.

EXAMPLE 3

2 g of trioxane was charged in a glass ampoule and sealed off. It was irradiated with gamma-rays from a cesium 137 source at the dose of $10^6$ R at 0° C, followed by after-effect polymerization at 55° C for 1 hour. Immediately thereupon, the seal was opened and 0.03 g of formaldehyde diethyl acetal was introduced into the ampoule, and sealed. The mixture was then subjected to further polymerization for 2 hours. Thereafter, the second irradiation was conducted with gamma-rays from the same source at the dose of $10^5$ R, followed again by after-effect polymerization at 55° C for 5 hours, to obtain 1.44 g of polymer at the yield of 72%. Average thermal degradation rate $K_{222}$:0.27; intrinsic viscosity number: 1.2.

Incidentally, the yield of the first after-effect polymerization was 42%, the polymer produced being 0.84 g. Average thermal degradation rate $K_{222}$:0.52; intrinsic viscosity number: 1.3.

EXAMPLE 4

2 g of trioxane was put into a glass ampoule and added and mixed with 0.01 g of formaldehyde diethyl acetal. The mixture was then cooled to −78° C and sealed off in vacuum. It was irradiated with gammma-rays from a cobalt 60 source at the dose of $1.3 \times 10^6$ R, followed by after-effect polymerization at 55° C for 2 hours. Thereupon, the second irradiaton was conducted at the dose of $5 \times 10^5$ R at −78° C, followed by the second after-effect polymerization at 55° C for 10 hours, to produce 1.74 g of polymer at the yield of 87%. Average thermal degradation rate $K_{222}$:0.32; intrinsic viscosity number: 0.9.

Incidentally, the yield of the first after-effect polymerization was 35%, the polymer produced being 0.7 g. Average thermal degradation rate $K_{222}$:0.7; intrinsic viscosity number: 1.2.

EXAMPLE 5

2 g of trioxane was put into a glass ampoule and added and mixed with 0.01 g of propionaldehyde dimethyl acetal. The mixture was then cooled down to −78° C and sealed off in vacuum. It was inadiated with gamma-rays from a cobalt 60 source at the dose of $10^6$ R, followed by after-effect polymerization. Thereafter, the second irradiation was conducted at the dose rate of $5 \times 10^4$ R/hr. at 58° C for 2 hours, to effect simultaneous polymerization, to produce 1.36 g. of polymer at the yield of 68%. Average thermal degradation rate $K_{222}$:0.35; intrinsic viscosity number: 1.3.

Incidentally, the yield of the first after-effect polymerization was 32%, the polymer produced being 0.64 g. Average thermal degradation rate $K_{222}$:0.72; intrinsic viscosity number: 1.3.

For comparative purposes, the first irradation of Example 5 was carried out with the same gamma-rays at the dose rate of $5 \times 10^5$ R/hr. at 58° C for 2 hours, to effect simultaneous polymerization. Thereafter, further irradiation was conducted at a reduced dose rate of $5 \times 10^4$ R/hr. at the same temperature for 2 hours, to continue the simultaneous polymerization. The resulting product polymer was found to have an intrinsic viscosity number of 0.4 and a too low molecular weight to be suitable for practical uses.

What is claimed is:

1. A multi-step process of producing polyoxymethylenes by the solid state polymerization of trioxane, which comprises:
   a. irradiating trioxane with $5 \times 10^4$ to $2 \times 10^6$ R of ionizing radiation at a first temperature at which no polymerization of trioxane takes place.
   b. then causing polymerization of the irradiated trioxane by raising said first temperature to a second temperature which is at least 15° C above said first temperature at which polymerization of trioxane takes place, said polymerization being effected in the presence of 0.01 to 10% by weight based on the weight of the trioxane of alkyl acetal and
   c. thereafter again irradiating the polymerized product thus obtained with a dose from $5 \times 10^4$ to $10^6$ R and
   d. further polymerizing the irradiated product of (c).

2. The process of claim 1, wherein said first temperature is above about −78° C, while said second temperature is below +64° C, and wherein irradiation step (c) is carried out at a temperature below +64° C.

3. The process of claim 1, wherein the first temperature is below room temperature and the second temperature is above room temperature.

4. The process as claimed in claim 1, wherein step (a) is carried out within a temperature range of about −78° C to room temperature, while step (b) is carried out within a temperature range of about between 45°0 to 58° C.

5. The process of claim 1, wherein the irradiation of step (c) is effected at a temperature at which no polymerization takes place and, whereafter the temperature is raised to a value to cause the further polymerization of step (d).

6. A process as claimed in claim 1, wherein said amount of alkyl acetal is at least partially present during the irradiation of step (a).

7. A process as claimed in claim 1, wherein at least a portion of said amount of alkyl acetal is added to the trioxane during step (b).

8. A process as claimed in claim 1, wherein said alkyl acetal has the formula

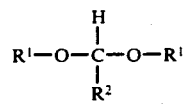

wherein $R^1$ is alkyl having 1-6 carbon atoms and $R^2$ is selected from the group consisting of hydrogen and alkyl having 1-5 carbon atoms.

9. A process as claimed in claim 1, wherein said amount of alkyl acetal is between about 0.1 to about 5% by weight.

10. A process as claimed in claim 8, wherein said amount of alkyl acetal is between about 0.1 to about 5% by weight.

11. A process as claimed in claim 1, wherein the irradiation of step (c) is effected above room temperature, whereby the further polymerization of step (d) takes place simultaneously with step (c).

* * * * *